April 8, 1952  T. S. SKILLMAN  2,591,971
CONVEYER BELT APPARATUS
Filed March 2, 1948
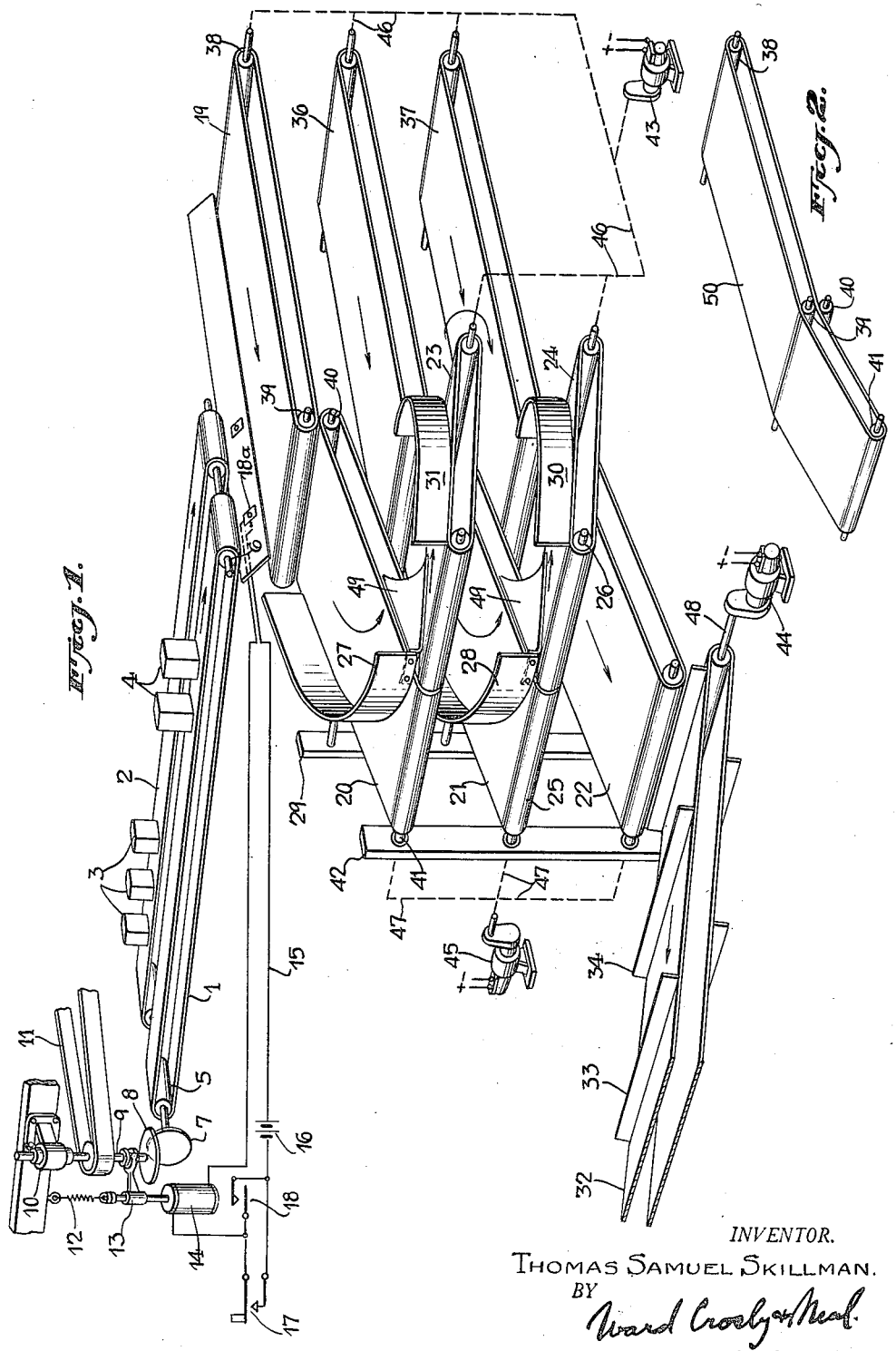
INVENTOR.
THOMAS SAMUEL SKILLMAN.
BY
*Ward Crosby & Neal*
ATTORNEYS.

Patented Apr. 8, 1952

2,591,971

UNITED STATES PATENT OFFICE 2,591,971

CONVEYER BELT APPARATUS

Thomas Samuel Skillman, Mosman, near Sydney, New South Wales, Australia, assignor to Punch Engineering Pty. Limited, Cammeray, near Sydney, New South Wales, Australia, a company incorporated of New South Wales, Australia Application March 2, 1948, Serial No. 12,527
In Australia March 5, 1947

8 Claims. (Cl. 198—84)

This invention pertains to improvements in conveyor belt apparatus, particularly adapted for use in stock distributing systems and the like, for selectively collecting various articles of merchandise and the like for storage belts containing the same, and transporting these articles to a common delivery point.

A stock distributing system of the type to which the invention is especially adapted, i. e., a so-called "automatic shop," is described in my copending application Ser. No. 643,945, filed January 28, 1946.

In the stock distributing system of my said copending application, the various articles to be dispensed are stored on normally stationary belts, which are selectively actuated under key or push-bottom control, whereby the article or articles to be collected are separated off from the remainder of the stored articles, by movement of a storage belt or belts to positions where the articles to be collected fall or move under the influence of gravity along collecting chutes and normally driven conveyor belts to the delivery point.

In accordance with a feature of the present invention, a novel conveyor belt arrangement is employed for collecting the articles from the storage belts and transporting the same thence to the delivery point, this novel arrangement including a pair of complementary and oppositely sloping conveyor belt systems, so arranged and relatively disposed as automatically to convey articles released from the storage belts downwardly by successive transfer from one to the other of the two complementary sloping belt systems. To this end, each of these complementary belt systems comprises a plurality of vertically spaced and aligned, roll-supported, endless conveyor belts, the belts of one system being mounted laterally adjacent to those of the other, and oppositely sloping to such extent that the belts of one system extend successively between the lower and upper ends respectively of vertically adjacent belts of the other system, the carrying part of each belt of said one system meeting the carrying part of each contiguous belt of said other system. Stationary guides are so mounted adjacent the meeting points of said carrying parts as automatically to deflect or transfer the articles being conveyed from the lower end of a belt in one system to the upper end of a belt in the complementary system, when the belts are concurrently driven in a common direction of feed. In normal operation, the belts of these two systems are driven continuously in a common direction of feed as aforesaid, by power actuation of certain of the supporting rolls.

Another feature of the invention resides in the provision of a series of horizontal or substantially horizontal collector belts, arranged to collect released articles from a series of horizontally positioned discharge points, onto each of said collector belts. These collector belts are so arranged one above the other that their discharge ends coincide with the upper ends of corresponding sloping belts in the complementary conveyor belt system above described. The normally horizontal belts are likewise continuously driven, automatically to feed articles delivered thereon onto the associated belts of the sloping belt systems.

In a preferred modification of the invention, the normally stationary storage belts for storing the various articles to be dispensed terminate adjacent the horizontally disposed collector belts, and slightly above the same, being spaced laterally adjacent therealong, whereby upon actuation of any of said storage belts, the articles supported thereon will fall by gravity onto an associated, continuously driven horizontal belt, which latter then feeds the article onto the sloping belt system, which latter then delivers the articles to a common delivery point at the lower end thereof.

According to a further feature of the invention, all articles thus delivered to and collected by the complementary sloping belt systems are transferred, at the lower end thereof, to a continuously driven elevator belt, the latter being provided with upstanding partitions or flanges for conveying the selected articles to a common delivery point, as for example a store or shop front, where they are picked up by the purchaser.

In accordance with a further modification of the invention, the inclined belts of at least one of the complementary sloping belt systems can be made continuous with the associated horizontally disposed collecting belts. In accordance with this modification, a continuous belt, after moving past the horizontal position, is simply taken over a roller down the sloping portion, passing thence over a supporting roll and returning thence to the horizontal portion over a guide roll. In a similar manner, horizontal collecting belts can be arranged to discharge into both of the complementary systems of sloping belts, and in each the horizontal and sloping belt portion may comprise one and the same belt.

The details of the above and other features of the invention will become apparent from the following description taken with reference to the accompanying drawings, wherein:

Fig. 1 is a perspective view, in more or less schematic form, of a stock distributing and collecting belt system in accordance with the invention, wherein the horizontally disposed collector belts are separate and distinct from the sloping belt systems; while Fig. 2 is a detail drawing, illustrating in perspective view the modification of the invention wherein a horizontal collector belt is made continuous with the associated sloping belt of the sloping belt system.

Referring to Fig. 1, the stock distribution system shown therein comprises a series of normally stationary storage belts, such as 1, 2, on which the articles 3, 4 to be dispensed are stored. Each belt is mounted on rolls, as at 5, 6. For intermittently driving these belts, a roll of each, such as 5 for belt 1, has keyed thereto a disc 7 engageable by a co-operating disc 8, the latter keyed to a shaft 9 journaled to a bearing support 10, and continuously driven by a belt and pulley arrangement 11 from a power shaft (not shown). Shaft 9 is axially displaceable in journal 10, and is normally maintained in the position shown to disengage the clutch mechanism, i. e., discs 7, 8, by virtue of spring 12 extending between a fixed support and an arm 13 secured at one end to shaft 9 as shown, arm 13 in turn comprising the armature of a solenoid 14. The winding of solenoid 14 is energizable over a circuit 15 containing, in series, a power source or battery 16, normally open contacts of a push-button or key switch 17, and normally closed contacts of a second switch 18a, which latter is actuated by the articles dispensed, as explained below. When key 17 is momentarily depressed, solenoid 14 is immediately energized and locked up through locking contacts 18, thereby to engage the driving disc 8 with the driven disc 7, to feed belt 1 forward in the direction of the arrow thereon.

The articles 4 are thus fed forward until the foremost one topples by gravity over the forward end 6 of the belt onto a collector belt 19 horizontally disposed at right angles to the storage belts 1, 2, and at a somewhat lower level, as indicated, this belt being continuously driven in the direction of the arrow thereon as explained below. As the foremost article thus topples over from the storage belt 1 onto collector belt 19, it momentarily actuates switch 18a, thereby to open the solenoid circuit 15, and thus disengage the clutch mechanism 5, 8 to bring the storage belt 1 to rest. Additional articles 4 may be dispensed in similar fashion by again depressing key 17. Likewise, articles 3 on belt 2 may be similarly dispensed by depressing the key associated therewith corresponding to 17. It will be understood, of course, that other storage belts may be provided in addition to belts 1 and 2, and laterally disposed along the collector belt 19 in the manner shown for belts 1 and 2, each storage belt being provided with its own key-actuated drive mechanism similar to that shown for belt 1.

The articles thus discharged onto the collector belt 19 are conveyed thence in the direction of the arrow and discharged by gravity onto the upper end of the sloping belt 20, continuously driven in the direction of the arrow thereon as explained below. Belt 20 is one of a series of vertically spaced and aligned belts 20, 21, 22, all sloping in a common direction, as shown, and comprising one of the pair of oppositely sloping, complementary belt systems above referred to, the complementary system comprising the oppositely sloping, vertically spaced and aligned belts 23, 24, mounted laterally adjacent the belts 20—22 of the first system as shown.

It will be observed, in the arrangement shown, that whereas the upper belt 20 of the first sloping belt system slopes downwardly from collector belt 19, the upper belt 23 of the complementary system slopes downwardly from the lower end of belt 20 in the first system to the upper end of the second belt 21 therein. Similarly, the second belt 24 in the complementary system slopes downwardly from the lower end of the second belt 21 of the first system to the upper end of the third or lowermost belt 22 thereof. Thus, the belts of the complementary system extend successively between the lower and upper ends respectively of vertically adjacent belts of the first system. In the embodiment illustrated by way of example, the carrying parts of contiguous belts meet approximately at the ends thereof, contiguous belt ends of the two systems being disposed substantially in axial alignment as shown for example at 25, 26. Provided, however, the condition be fulfilled that the carrying parts of contiguous belts meet, it is not necessary that their meeting point be at the end of each, and a possible alternative embodiment, in which the meeting point is displaced from the end of one belt, is described later.

As explained below, all belts of the two systems are driven in the direction of the arrows thereon, and stationary guides, such as 27, 28, secured to uprights, as at 29, are spaced slightly above the lower ends of belts 20, 21 of the first system for deflecting and transferring articles conveyed thereon to the adjacent belts 23, 24 respectively of the complementary system. Similar guides 30, 31 are provided at the lower ends of belts 23, 24, for transferring the articles back onto belts 21, 22 respectively of the first system. These guides can either be curved as shown in Fig. 1 or can stretch straight over the corresponding belts under a fixed angle, for example 45 degrees.

To facilitate the smooth transfer of articles from one sloping belt to the other slides can be arranged between the belts as indicated by the slide 49 between belt 21 and belt 24. Similar slides can be provided between the other sloping belts at the points where articles are transferred from one belt to the other. The slide 49 is suitably secured to the upright 29 and slopes down from belt 21 to belt 24 under such an angle that even small articles will be transferred safely. An angle of 20 degrees to the horizontal plane has been found sufficient for this purpose. To avoid a stoppage of articles at the lower end of slide 49 the slide either overlaps the lower belt or breaks up under a steep angle, so that each article passing the slide falls upon belt 24 and is thus carried away. Each slide is extended over more than half the length of the corresponding belt so that an article falling over the inner edge of the slide will be taken up by the next slide underneath extending from the other side of the sloping belts to the middle.

Articles delivered from the collector belt 19 onto the upper sloping belt 20 are conveyed continuously downward by successive transfer from the lower ends of the belts in one system to the upper ends of those in the other, until they are finally delivered to the lower end of the lowermost belt 22. At this point, the articles fall by gravity onto an elevator belt 32, driven in the direction of the arrow thereon, and provided at spaced intervals with upstanding partitions or flanges, as at 33, 34, for conveying the articles upwardly to a common delivery point in a store or shop front where they are picked up by the purchaser. The successive transfer of articles and the continuous reversal in the direction of their movement considerably reduces their velocity.

Additional horizontal collector belts may be provided, as at 36, 37, vertically spaced one above another below collector belt 19, and arranged at appropriate levels for discharging onto successively lower sloping belts 21 and 22, as shown. Additional storage belts, similar to 1 and 2, will be arranged to discharge onto collector belts 36 and 37 in the same manner that belts 1 and 2 discharge onto collector belt 19. Also, it will be understood that the storage belts may be arranged to feed in from both sides of the collector belts. That is to say, for example, the storage belt arrangement shown in the drawing as feeding in to the left side of collector belt 19 may be duplicated on the right side thereof, and the same for collector belts 36 and 37. Thus, an extremely compact storage, transporting and collecting system is provided. Also horizontal collector belts and associated storage belts can be arranged to discharge onto the upper ends of the sloping belts 23, 24, in the same manner as illustrated in the drawing for the storage collector and sloping belts 1, 2, 19 and 20 for example.

Instead of transporting all articles down to the last sloping belt 22, one of the intermediate belts, for example belt 21, can discharge directly into the elevator belt 32. In the latter case guide 28 and belt 24 would be omitted.

The various collector and sloping belts are mounted on rolls, as at 38, 39, 40, 41, these rolls being journaled to appropriately positioned uprights, as at 42, and certain of the rolls being driven, for example, from motors such as 43, 44, 45, through appropriate interconnecting gearing or pulley arrangements as indicated, for example, by the dash lines 46, 47, and shaft 48.

It will be clear that the various belts 20 to 24 inc. of the sloping belt system do not need to be of the same length. For example, if the vertical height between belts 36 and 37 is greater than the vertical height between belts 19 and 36, then belts 21 and 24 can be made longer than the belts 20 and 23, so that they can have the same slope as the other belts of the system. Similarly, belt 22 need not bear any relation in its length to the lengths of the other belts. Variations from equal slopes may be made and the complementary systems may be so arranged, in relation to each other that the ends of the sloping belts of one system meet the sloping belts of the other system further down from the upper ends of these belts, without departing from the spirit of the invention. This is the arrangement previously referred to in which the carrying parts of contiguous belts meet at a point displaced from the end of one belt, and it is especially useful when the velocity of articles transferred from one sloping belt to the other is comparatively great. An article when gliding from one sloping belt over the slide on to the next belt will keep up its direction of movement for a short time and thus glide upwards towards the top end of the next belt against the movement of this belt. By this action the movement of the article in its previous direction is stopped and the article is then transported by the next sloping belt to the next transfer point, where the same performance repeats itself, so that the article is ultimately discharged to the elevator belt with a velocity depending only on the slope of the last belt in the sloping belt systems. Furthermore, the lower belts may be wider than the upper belts in order that they may accommodate a greater number of articles.

Likewise, the collector and associated sloping belts, such as belts 19 and 20 of Fig. 1, may be combined into one continuous belt, in the manner illustrated in Fig. 2. Referring to Fig. 2, a continuous belt 50 extends over the supporting roll 38 and thence horizontally to and over guide roll 39, and thence downwardly and about supporting roll 41, returning thence back between the guide roll 39 and guide roll 40 to the supporting roll 38.

I claim:

1. Apparatus for automatically conveying articles from one level to another, comprising: a pair of endless conveyor belts, one starting on a higher level than the other, so mounted on rolls in oppositely sloping, laterally adjacent relation that the carrying part of the higher of said belts meets the carrying part of the lower of said belts, together with stationary guide means thereat for automatically deflecting said articles from one belt to the other when driven, delivery means for delivering said articles to one said belt, receiving means for receiving said articles from the other belt, and means for concurrently so driving said belts as automatically to convey to said receiving means articles delivered from said delivery means.

2. Apparatus for automatically conveying articles from one level to another, comprising: a pair of vertically spaced and aligned, roll-supported, endless conveyor belts sloping in a common direction; a third roll-supported endless conveyor belt laterally displaced from said pair, and extending between the lower end of the upper belt of said pair to the upper end of the lower belt thereof, the carrying part of said third belt meeting the carrying part of each of said pair; stationary guides mounted adjacent the upper and lower ends of said third belt, for deflecting said articles from one belt to another when driven; delivery means for delivering articles to one belt of said pair, and means for receiving said articles from the other belt of said pair; and means for concurrently so driving said belts as to convey said articles thereover from said delivery to said receiving means.

3. Apparatus for automatically conveying articles from one level to another, comprising: two laterally adjacent conveyor belt systems, the conveyor belts of one system sloping in an opposite direction to the conveyor belts of the other system, each system comprising a plurality of vertically spaced and aligned, roll-supported, endless conveyor belts, so disposed that a plurality of the belts of one of said systems extend successively between the lower and upper ends respectively of vertically adjacent belts of the other of said systems and the carrying part of said last-mentioned plurality of belts meets the carrying part of each of said adjacent belts and so disposed that the higher end of the top belt of one of said systems is at said one level and the lower end of the lowermost belt of one of said systems is at said other level; stationary guide means disposed adjacent the meeting points of said carrying parts for transferring said articles from one belt to another when driven; delivery means for delivering said articles onto one belt of said systems, and receiving means for receiving said articles from another belt of said systems; and means for concurrently so driving said belts as automatically to convey said articles over said belts from said delivery to said receiving means.

4. In a stock distributing system, apparatus for collecting and transporting articles from one level to another, comprising: two complementary sloping belt systems, arranged to carry said articles downward by transfer from one to the other of said systems, each system comprising a plurality of continuously driven sloping belts, arranged vertically one above the other, with belts of one system sloping in the opposite direction to those of the other, and so disposed that a plurality of the belts of one of said systems extend successively between the lower and upper ends respectively of vertically adjacent belts of the other of said systems, and the carrying part of said last-mentioned plurality of belts meets the carrying part of each of said adjacent belts and so disposed that the higher end of the top belt of one of said systems is at said one level and the lower end of the lowermost belt of one of said systems is at said other level; and stationary guide means mounted adjacent contiguous belt ends of the two systems for transferring said articles from the lower end of one belt to the upper end of a contiguous belt, and means for concurrently driving said belts in a common direction of feed.

5. In a stock distributing system, apparatus for collecting and transporting articles from one level to another, comprising: two laterally adjacent conveyor belt systems, the conveyor belts of one system sloping in an opposite direction to the conveyor belts of the other system, each system comprising a plurality of vertically spaced and aligned, roll-supported, endless conveyor belts, so disposed that a plurality of the belts of one of said systems extend successively between the lower and upper ends respectively of vertically adjacent belts in the other of said systems and the carrying part of said last-mentioned plurality of belts meets the carrying part of each of said adjacent belts and so disposed that the higher end of the top belt of one of said systems is at said one level and the lower end of the lowermost belt of one of said systems is at said other level; stationary guide means disposed adjacent contiguous belt ends of the two systems for transferring said articles from one belt to another; means for concurrently driving said belts in a common direction of feed; a plurality of substantially horizontal, vertically spaced, roll-supported collector belts for delivering said articles into said sloping belt systems; each said collector belt terminating adjacent the upper end of one of said sloping belts; means for continuously driving said collector belts; and means for delivering said articles onto said collector belts.

6. In a stock distributing system, apparatus for collecting and transporting articles from one level to another, comprising: two complementary sloping belt systems arranged to carry said articles downward by transfer from one to the other of said systems, each system comprising a plurality of driven belts arranged vertically one above the other, with the belts of one system sloping in the opposite direction to those of the other, and so disposed that a plurality of the belts of one of said systems extend successively between the lower and upper ends respectively of vertically adjacent belts of the other of said systems and the carrying part of said last-mentioned plurality of belts meets the carrying part of each of said adjacent belts and so disposed that the higher end of the top belt of one of said systems is at said one level and the lower end of the lowermost belt of one of said systems is at said other level; stationary guide means disposed adjacent contiguous belt ends of the two systems for transferring articles from one belt to another when driven, at least one of said sloping belts including a horizontally extending portion supported on guide rolls for serving as a collector belt portion for said articles; and means for continuously and concurrently driving said belts in a common direction of feed.

7. Apparatus for automatically conveying articles from one level to another, comprising: two laterally adjacent conveyor belt systems, the conveyor belts of one system sloping in an opposite direction to the conveyor belts of the other system, each system comprising a plurality of vertically spaced and aligned, roll-supported, endless conveyor belts, so disposed that a plurality of the belts of one of said systems extend successively between the lower and upper ends respectively of vertically adjacent belts of the other of said systems and that the carrying part of each of said last-mentioned plurality of belts meets the carrying part of each of said adjacent belts and so disposed that the higher end of the top belt of one of said systems is at said one level and the lower end of the lowermost belt of one of said systems is at said other level; stationary guide means disposed adjacent the meeting points of said carrying parts for transferring said articles from one belt to another when driven; delivery means for delivering said articles to said conveyor belt systems; an elevator belt arranged at the lower end of said conveyor belt systems and provided with spaced partitions for upwardly transporting to a common collecting point articles received therefrom; and means for concurrently so driving said belts as automatically to convey to said elevator belt and thence to said common collecting point articles delivered from said delivery means.

8. In a stock distributing system, apparatus for collecting and transporting articles from one level to another, comprising: two laterally adjacent conveyor belt systems, the conveyor belts of one system sloping in an opposite direction to the conveyor belts of the other system, each system comprising a plurality of vertically spaced and aligned, roll-supported, endless conveyor belts, so disposed that a plurality of the belts of one of said systems extend successively between the lower and upper ends respectively of vertically adjacent belts in the other of said systems, and the carrying part of each of said last-mentioned plurality of belts meets the carrying part of each of said adjacent belts and so disposed that the higher end of the top belt of one of said systems is at said one level and the lower end of the lowermost belt of one of said systems is at said other level; stationary guide means disposed adjacent contiguous belt ends of the two systems for transferring said articles from one belt to another; means for concurrently driving said belts in a common direction of feed; a plurality of substantially horizontal, vertically spaced, roll-supported collector belts delivering said articles into said sloping belt systems, each said collector belt terminating adjacent the upper end of one of said sloping belts; and a plurality of roll-supported storage belts arranged to feed articles supported thereon onto said collector belts, together with key-controlled means for intermittently driving said storage belts for delivering said articles onto said collector belts.

THOMAS S. SKILLMAN.

REFERENCES CITED

The following references are of record in the file of this patent:

UNITED STATES PATENTS

| Number | Name | Date |
|---|---|---|
| 811,315 | McCabe | Jan. 30, 1906 |
| 883,204 | Kimball | Mar. 31, 1908 |
| 1,959,937 | Thatcher | May 22, 1934 |

FOREIGN PATENTS

| Number | Country | Date |
|---|---|---|
| 26,237 | France | Jan. 30, 1856 |
| (Addition to No. 539,309). | | |